(12) United States Patent
Wilson

(10) Patent No.: US 11,216,529 B2
(45) Date of Patent: Jan. 4, 2022

(54) SYSTEMS AND METHODS FOR CATEGORIZING, EVALUATING, AND DISPLAYING USER INPUT WITH PUBLISHING CONTENT

(71) Applicant: VERIZON PATENT AND LICENSING INC., Basking Ridge, NJ (US)

(72) Inventor: Jeffrey Todd Wilson, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 843 days.

(21) Appl. No.: 14/562,941

(22) Filed: Dec. 8, 2014

(65) Prior Publication Data
US 2016/0162500 A1 Jun. 9, 2016

(51) Int. Cl.
*G06F 16/958* (2019.01)
*G06Q 50/00* (2012.01)
*G06Q 30/02* (2012.01)

(52) U.S. Cl.
CPC .......... *G06F 16/958* (2019.01); *G06Q 30/02* (2013.01); *G06Q 50/01* (2013.01)

(58) Field of Classification Search
CPC .......................... G06F 17/2247; G06F 17/241
USPC ........................................ 715/230, 233, 234
See application file for complete search history.

(56) References Cited

U.S. PATENT DOCUMENTS

| 8,706,685 B1* | 4/2014 | Smith | G06F 17/30882 707/608 |
| 9,569,549 B1* | 2/2017 | Jenkins | G06F 17/30241 |
| 9,608,949 B2* | 3/2017 | Skyrm | H04L 51/10 |
| 2007/0055926 A1* | 3/2007 | Christiansen | G06F 17/241 715/210 |
| 2010/0312769 A1* | 12/2010 | Bailey | G06F 17/30705 707/740 |
| 2012/0030553 A1* | 2/2012 | Delpha | G06F 17/241 715/205 |
| 2012/0166180 A1* | 6/2012 | Au | G06F 17/274 704/9 |
| 2013/0046756 A1* | 2/2013 | Hao | G06Q 30/0201 707/723 |

(Continued)

OTHER PUBLICATIONS

Brandon Smith; The Beginner's Guide to Twitter; Nov. 2013; Mashable.com; pp. 1-32.*

(Continued)

*Primary Examiner* — Andrew R Dyer

(57) ABSTRACT

Systems and methods are provided for displaying received publishing content on a web page along with one or more user elements by which one or more users may submit sentiment input or textual input in relation to the received publishing content or a subportion of the received publishing content. A user input may be received related to the displayed publishing content displayed on the web page, the user input including an identification of a subportion of the displayed publishing content and a sentiment input or a textual input. Any user input received may be analyzed from each of one or more of the plurality of users in relation to the subportion. A sentiment score may be computed based on analysis of the analyzed user inputs received from each of one or more of the plurality of users.

11 Claims, 9 Drawing Sheets

(56) References Cited

U.S. PATENT DOCUMENTS

| | | | | |
|---|---|---|---|---|
| 2013/0054636 | A1* | 2/2013 | Tang | G06F 17/241 707/769 |
| 2014/0325557 | A1* | 10/2014 | Evans | H04N 21/4788 725/34 |
| 2014/0372226 | A1* | 12/2014 | Pavley | G06Q 30/0269 705/14.66 |
| 2015/0235672 | A1* | 8/2015 | Cudak | G11B 27/3081 386/241 |
| 2015/0346955 | A1* | 12/2015 | Fundament | H04N 21/4821 715/765 |

OTHER PUBLICATIONS

Ian Sample, "How computer-generated fake papers are flooding academia," The Guardian, Feb. 26, 2014; pp. 1-7.*

Francois-Guillaume Ribreau; [Twitter Unofficial API] Getting the tweet's number of favorites, RTs and replies; Jan. 26, 2012; blog.fgribreau.com; pp. 1-4.*

* cited by examiner

CHANGING POLITICAL LANDSCAPE ⟵ 2

[ SHOW SENTIMENT ] ⟵ 4
[ HIDE SENTIMENT ] ⟵ 6

302

UNFAVORABLE RATINGS FOR BOTH THE REPUBLICAN PARTY AND THE TEA PARTY HAVE TICKED UP
TO RECORD HIGHS, ACCORDING TO A CNN/ORC POLL RELEASED TUESDAY EVENING. 304

SIXTY-FOUR PERCENT OF AMERICANS VIEW THE REPUBLICAN PARTY UNFAVORABLY, AND 56 PERCENT
VIEW THE TEA PARTY UNFAVORABLY. BOTH ARE ALL-TIME HIGHS IN CNN'S POLLING, ALTHOUGH IN EACH
CASE, IT'S ONLY A 2-POINT INCREASE FROM A SURVEY TAKEN SEPT. 27 THROUGH 29.

PROMINENT REPUBLICANS HAVE ALSO TAKEN A HIT. ⟵ 306

308

HOUSE SPEAKER JOHN BOEHNER'S (OHIO) UNFAVORABLE RATING IS AT 55 PERCENT, UP FROM 48
PERCENT JUST BEFORE THE SHUTDOWN, WHILE SENATE MINORITY LEADER MITCH MCCONNELL'S (KY.)
UNFAVORABLES ROSE TO 42 PERCENT FROM 39 PERCENT BEFORE THE SHUTDOWN. MEMBERS OF THEIR
OWN PARTY ARE ALSO INCREASINGLY RATING THEM NEGATIVELY, ACCORDING TO POLLING. SEN. TED
CRUZ (TEXAS), ONE OF THE MOST VOCAL SUPPORTERS OF THE SHUTDOWN, SAW HIS UNFAVORABLE
RATING CLIMB 6 POINTS TO 42 PERCENT. 310

WHILE TOP DEMOCRATS ARE STILL VIEWED MORE NEGATIVELY THAN POSITIVELY, THEY'VE SEEN THEIR
NUMBERS IMPROVE, ACCORDING TO THE POLL. SENATE MAJORITY LEADER HARRY REID'S (NEV.)
UNFAVORABLE RATING IS AT 40 PERCENT, DOWN FROM 45 PERCENT AT THE END OF SEPTEMBER, WHILE
HOUSE MINORITY LEADER NANCY PELOSI'S (CALIF.) UNFAVORABLE RATING IS AT 47 PERCENT, DOWN
FROM 51 PERCENT. THE DEMOCRATIC PARTY'S UNFAVORABLE RATING REMAINS EFFECTIVELY
UNCHANGED AT 51 PERCENT, A POINT BELOW WHERE IT STOOD IN SEPTEMBER. 312

PREVIOUSLY RELEASED RESULTS FROM THE SAME POLL FOUND THAT A MAJORITY OF AMERICANS NOW
CONSIDER GOP CONTROL OF THE HOUSE A BAD THING, AND WANT BOEHNER TO BE REPLACED. OTHER
POST-SHUTDOWN POLLS HAVE ALSO FOUND REPUBLICANS SUFFERING FROM THE POLITICAL
AFTEREFFECTS. 314

THE CNN POLL SURVEYED 841 AMERICANS BETWEEN OCT. 18 AND OCT. 20, USING LIVE PHONE INTERVIEWS.

| COMMENTS | 8,956 | PENDING COMMENTS | 201 | VIEW FAQ |

[ POST A COMMENT ]        HUFFPOST SOCIAL NEWS                              316

*FIG. 3*

[ SHOW SENTIMENT ] ～～ 4
[ HIDE SENTIMENT ] ～～ 6
FOLLOW: VIDEO, GOP POLL, GOP TEA PARTY UNFAVORABILITY, REPUBLICAN PARTY FAVORABILITY, REPUBLICAN POLL, TEA PARTY FAVORABILITY, TEA PARTY POLL, POLITICS NEWS — 302

UNFAVORABLE RATINGS FOR BOTH THE REPUBLICAN PARTY AND THE TEA PARTY HAVE TICKED UP — 304
RECORD HIGHS, ACCORDING TO A CNN/ORC POLL RELEASED TUESDAY EVENING.

SIXTY-FOUR PERCENT OF AMERICANS VIEW THE REPUBLICAN PARTY UNFAVORABLY, AND 56 PERCENT VIEW THE TEA PARTY UNFAVORABLY. BOTH ARE ALL-TIME HIGHS IN CNN'S POLLING, ALTHOUGH IN EACH CASE, IT'S ONLY A 2-POINT INCREASE FROM A SURVEY TAKEN SEPT. 27 THROUGH 29.

```
COMMENT RELATED TO HIGHLIGHTED TEXT.
```

PROMINENT REPUBLICANS HAVE ALSO TAKEN A HIT. — 306       422   — 308

HOUSE SPEAKER JOHN BOEHNER'S (OHIO) UNFAVORABLE RATING IS AT 55 PERCENT, UP FROM 48 PERCENT JUST BEFORE THE SHUTDOWN, WHILE SENATE MINORITY LEADER MITCH MCCONNELL'S (KY.) UNFAVORABLES ROSE TO 42 PERCENT FROM 39 PERCENT BEFORE THE SHUTDOWN. MEMBERS OF THEIR OWN PARTY ARE ALSO INCREASINGLY RATING THEM NEGATIVELY, ACCORDING TO POLLING. SEN. TED CRUZ (TEXAS), ONE OF THE MOST VOCAL SUPPORTERS OF THE SHUTDOWN, SAW HIS UNFAVORABLE — 310
RATING CLIMB 6 POINTS TO 42 PERCENT.

WHILE TOP DEMOCRATS ARE STILL VIEWED MORE NEGATIVELY THAN POSITIVELY, THEY'VE SEEN THEIR NUMBERS IMPROVE, ACCORDING TO THE POLL. SENATE MAJORITY LEADER HARRY REID'S (NEV.) UNFAVORABLE RATING IS AT 40 PERCENT, DOWN FROM 45 PERCENT AT THE END OF SEPTEMBER, WHILE HOUSE MINORITY LEADER NANCY PELOSI'S (CALIF.) UNFAVORABLE RATING IS AT 47 PERCENT, DOWN FROM 51 PERCENT. THE DEMOCRATIC PARTY'S UNFAVORABLE RATING REMAINS EFFECTIVELY
UNCHANGED AT 51 PERCENT, A POINT BELOW WHERE IT STOOD IN SEPTEMBER. — 312

PREVIOUSLY RELEASED RESULTS FROM THE SAME POLL FOUND THAT MAJORITY OF AMERICANS NOW CONSIDER GOP CONTROL OF THE HOUSE A BAD THING, AND WANT BOEHNER TO BE REPLACED. OTHER POST-SHUTDOWN POLLS HAVE ALSO FOUND REPUBLICANS SUFFERING FROM THE POLITICAL AFTEREFFECTS.

*FIG. 4*

[ SHOW SENTIMENT ] — 4
[ HIDE SENTIMENT ] — 6

FOLLOW: VIDEO, GOP POLL, GOP TEA PARTY UNFAVORABILITY, REPUBLICAN PARTY FAVORABILITY, 502
REPUBLICAN POLL, TEA PARTY FAVORABILITY, TEA PARTY POLL, POLITICS NEWS

32 — UNFAVORABLE RATINGS FOR BOTH THE REPUBLICAN PARTY AND THE TEA PARTY HAVE TICKED UP RECORD HIGHS, ACCORDING TO A CNN/ORC POLL RELEASED TUESDAY EVENING.

34 [CP]
36
62

504 — SIXTY-FOUR PERCENT OF AMERICANS VIEW THE REPUBLICAN PARTY UNFAVORABLY, AND 56 PERCENT VIEW THE TEA PARTY UNFAVORABLY. BOTH ARE ALL-TIME HIGHS IN CNN'S POLLING, ALTHOUGH IN EACH CASE, IT'S ONLY A 2-POINT INCREASE FROM A SURVEY TAKEN SEPT. 27 THROUGH 29.

506 — PROMINENT REPUBLICANS HAVE ALSO TAKEN A HIT.

508 — HOUSE SPEAKER JOHN BOEHNER'S (OHIO) UNFAVORABLE RATING IS AT 55 PERCENT, UP FROM 48 PERCENT JUST BEFORE THE SHUTDOWN, WHILE SENATE MINORITY LEADER MITCH MCCONNELL'S (KY.) UNFAVORABLES ROSE TO 42 PERCENT FROM 39 PERCENT BEFORE THE SHUTDOWN. MEMBERS OF THEIR OWN PARTY ARE ALSO INCREASINGLY RATING THEM NEGATIVELY. ACCORDING TO POLLING, SEN. TED CRUZ (TEXAS), ONE OF THE MOST VOCAL SUPPORTERS OF THE SHUTDOWN, SAW HIS UNFAVORABLE RATING CLIMB 6 POINTS TO 42 PERCENT.

510 — WHILE TOP DEMOCRATS ARE STILL VIEWED MORE NEGATIVELY THAN POSITIVELY, THEY'VE SEEN THEIR NUMBERS IMPROVE, ACCORDING TO THE POLL. SENATE MAJORITY LEADER HARRY REID'S (NEV.) UNFAVORABLE RATING IS AT 40 PERCENT, DOWN FROM 45 PERCENT AT THE END OF SEPTEMBER, WHILE HOUSE MINORITY LEADER NANCY PELOSI'S (CALIF.) UNFAVORABLE RATING IS AT 47 PERCENT, DOWN FROM 51 PERCENT. THE DEMOCRATIC PARTY'S UNFAVORABLE RATING REMAINS EFFECTIVELY UNCHANGED AT 51 PERCENT, A POINT BELOW WHERE IT STOOD IN SEPTEMBER.

512 — PREVIOUSLY RELEASED RESULTS FROM THE SAME POLL FOUND THAT MAJORITY OF AMERICANS NOW CONSIDER GOP CONTROL OF THE HOUSE A BAD THING, AND WANT BOEHNER TO BE REPLACED. OTHER POST-SHUTDOWN POLLS HAVE ALSO FOUND REPUBLICANS SUFFERING FROM THE POLITICAL AFTEREFFECTS.

514 — THE CNN POLL SURVEYED 841 AMERICANS BETWEEN OCT. 18 AND OCT. 20, USING LIVE PHONE INTERVIEWS.

*FIG. 6*

[ SHOW SENTIMENT ] — 4
[ HIDE SENTIMENT ] — 6

FOLLOW: VIDEO, GOP POLL, GOP TEA PARTY UNFAVORABILITY, REPUBLICAN PARTY FAVORABILITY, REPUBLICAN POLL, TEA PARTY FAVORABILITY, TEA PARTY POLL, POLITICS NEWS — 502

72 — UNFAVORABLE RATINGS FOR BOTH THE REPUBLICAN PARTY AND THE TEA PARTY HAVE TICKED UP RECORD HIGHS, ACCORDING TO A CNN/ORC POLL RELEASED TUESDAY EVENING.

32 — COMMENT RELATED TO HIGHLIGHTED TEXT.

34 / 36 — COMMENT RELATED TO FULL PARAGRAPH.

74 / 76 — SECOND COMMENT RELATED TO FULL PARAGRAPH.

504 — SIXTY-FOUR PERCENT OF AMERICANS VIEW THE REPUBLICAN PARTY UNFAVORABLY, AND 56 PERCENT VIEW THE TEA PARTY UNFAVORABLY. BOTH ARE ALL-TIME HIGHS IN CNN'S POLLING, ALTHOUGH IN EACH CASE, IT'S ONLY A 2-POINT INCREASE FROM A SURVEY TAKEN SEPT. 27 THROUGH 29.

506 — PROMINENT REPUBLICANS HAVE ALSO TAKEN A HIT.

508 — HOUSE SPEAKER JOHN BOEHNER'S (OHIO) UNFAVORABLE RATING IS AT 55 PERCENT, UP FROM 48 PERCENT JUST BEFORE THE SHUTDOWN, WHILE SENATE MINORITY LEADER MITCH MCCONNELL'S (KY.) UNFAVORABLES ROSE TO 42 PERCENT FROM 39 PERCENT BEFORE THE SHUTDOWN. MEMBERS OF THEIR OWN PARTY ARE ALSO INCREASINGLY RATING THEM NEGATIVELY, ACCORDING TO POLLING. SEN. TED CRUZ (TEXAS), ONE OF THE MOST VOCAL SUPPORTERS OF THE SHUTDOWN, SAW HIS UNFAVORABLE RATING CLIMB 6 POINTS TO 42 PERCENT.

510 — WHILE TOP DEMOCRATS ARE STILL VIEWED MORE NEGATIVELY THAN POSITIVELY, THEY'VE SEEN THEIR NUMBERS IMPROVE, ACCORDING TO THE POLL. SENATE MAJORITY LEADER HARRY REID'S (NEV.) UNFAVORABLE RATING IS AT 40 PERCENT, DOWN FROM 45 PERCENT AT THE END OF SEPTEMBER, WHILE HOUSE MINORITY LEADER NANCY PELOSI'S (CALIF.) UNFAVORABLE RATING IS AT 47 PERCENT, DOWN FROM 51 PERCENT. THE DEMOCRATIC PARTY'S UNFAVORABLE RATING REMAINS EFFECTIVELY UNCHANGED AT 51 PERCENT, A POINT BELOW WHERE IT STOOD IN SEPTEMBER.

512 — PREVIOUSLY RELEASED RESULTS FROM THE SAME POLL FOUND THAT MAJORITY OF AMERICANS NOW CONSIDER GOP CONTROL OF THE HOUSE A BAD THING, AND WANT BOEHNER TO BE REPLACED. OTHER POST-SHUTDOWN POLLS HAVE ALSO FOUND REPUBLICANS SUFFERING FROM THE POLITICAL AFTEREFFECTS.

514 — THE CNN POLL SURVEYED 841 AMERICANS BETWEEN OCT. 18 AND OCT. 20, USING LIVE PHONE INTERVIEWS.

*FIG. 7*

[ SHOW SENTIMENT ] — 4
[ HIDE SENTIMENT ] — 6
FOLLOW: VIDEO, GOP POLL, GOP TEA PARTY UNFAVORABILITY, REPUBLICAN PARTY FAVORABILITY, 502
REPUBLICAN POLL, TEA PARTY FAVORABILITY, TEA PARTY POLL, POLITICS NEWS

82 — UNFAVORABLE RATINGS FOR BOTH THE REPUBLICAN PARTY AND THE TEA PARTY HAVE TICKED UP RECORD HIGHS, ACCORDING TO A CNN/ORC POLL RELEASED TUESDAY EVENING.

32 — PREVIOUSLY POSTED COMMENT.

34 [CP] PREVIOUSLY POSTED COMMENT.

36
84 — [CP] PREVIOUSLY POSTED COMMENT.
86

504 — SIXTY-FOUR PERCENT OF AMERICANS VIEW THE REPUBLICAN PARTY UNFAVORABLY, AND 56 PERCENT VIEW THE TEA PARTY UNFAVORABLY. BOTH ARE ALL-TIME HIGHS IN CNN'S POLLING, ALTHOUGH IN EACH CASE, IT'S ONLY A 2-POINT INCREASE FROM A SURVEY TAKEN SEPT. 27 THROUGH 29.

506 — PROMINENT REPUBLICANS HAVE ALSO TAKEN A HIT.

508 — HOUSE SPEAKER JOHN BOEHNER'S (OHIO) UNFAVORABLE RATING IS AT 55 PERCENT, UP FROM 48 PERCENT JUST BEFORE THE SHUTDOWN, WHILE SENATE MINORITY LEADER MITCH MCCONNELL'S (KY.) UNFAVORABLES ROSE TO 42 PERCENT FROM 39 PERCENT BEFORE THE SHUTDOWN. MEMBERS OF THEIR OWN PARTY ARE ALSO INCREASINGLY RATING THEM NEGATIVELY, ACCORDING TO POLLING. SEN. TED CRUZ (TEXAS), ONE OF THE MOST VOCAL SUPPORTERS OF THE SHUTDOWN, SAW HIS UNFAVORABLE RATING CLIMB 6 POINTS TO 42 PERCENT.

510 — WHILE TOP DEMOCRATS ARE STILL VIEWED MORE NEGATIVELY THAN POSITIVELY, THEY'VE SEEN THEIR NUMBERS IMPROVE, ACCORDING TO THE POLL. SENATE MAJORITY LEADER HARRY REID'S (NEV.) UNFAVORABLE RATING IS AT 40 PERCENT, DOWN FROM 45 PERCENT AT THE END OF SEPTEMBER, WHILE HOUSE MINORITY LEADER NANCY PELOSI'S (CALIF.) UNFAVORABLE RATING IS AT 47 PERCENT, DOWN FROM 51 PERCENT. THE DEMOCRATIC PARTY'S UNFAVORABLE RATING REMAINS EFFECTIVELY UNCHANGED AT 51 PERCENT, A POINT BELOW WHERE IT STOOD IN SEPTEMBER.

512 — PREVIOUSLY RELEASED RESULTS FROM THE SAME POLL FOUND THAT MAJORITY OF AMERICANS NOW CONSIDER GOP CONTROL OF THE HOUSE A BAD THING, AND WANT BOEHNER TO BE REPLACED. OTHER POST-SHUTDOWN POLLS HAVE ALSO FOUND REPUBLICANS SUFFERING FROM THE POLITICAL AFTEREFFECTS.

514 — THE CNN POLL SURVEYED 841 AMERICANS BETWEEN OCT. 18 AND OCT. 20, USING LIVE PHONE INTERVIEWS.

*FIG. 8*

SYSTEMS AND METHODS FOR CATEGORIZING, EVALUATING, AND DISPLAYING USER INPUT WITH PUBLISHING CONTENT

TECHNICAL FIELD

Various embodiments of the present disclosure relate generally to processing electronic messages, such as over the Internet. More specifically, particular embodiments of the present disclosure relate to systems and methods for processing, evaluating, and displaying user-generated sentiment input and user-generated comments related to web pages and subportions of web pages.

BACKGROUND

Typically, online publishers, such as online media companies and other publishers of articles, stories, and other electronic content, provide online web page space and mechanisms for viewers to comment on, or otherwise interact with, that published content. Some published content attracts many comments, which may be too numerous for a reader to easily review and digest. Large sites with lots of traffic can receive thousands of user comments in relation to a single popular article. The prevalent way to present comments related to the articles is to present them together at the end of the article, which may not be ideal for all readers. Often, the comments themselves are as interesting as the content, but reading through all of them to find particular takes or opinions is not practical.

In some cases, comments may relate only to one subportion, e.g., a particular paragraph, sentence, fact, etc., of the article. Also, specific claims or facts cited in articles may be of special interest and may spark robust debate, but comments specific to such points cannot be discerned from general comments about the article. Because comments are typically displayed in sequential order, it can be difficult for readers to identify comments related to specific topics or specific subportions of interest to the reader. Due to the standard location and scope of comments, comments of interest to a particular user may be too far down a chain of comments to appear within a useful distance from the original content.

Similarly, some online media companies allow users to rate or provide other forms of expressing sentiment regarding an article as a whole, but no ability to express sentiment or view the overall sentiment related to specific subportions or specific user comments.

SUMMARY OF THE DISCLOSURE

According to certain embodiments, computer-implemented methods are disclosed for evaluating user input relating to electronic published content. In an exemplary method, the method includes: receiving, over an electronic network, electronic publishing content for display online; displaying the received publishing content on a web page along with one or more user elements by which one or more users may submit sentiment input or textual input in relation to the received publishing content or a subportion of the received publishing content; receiving, from each of a plurality of users, a user input related to the displayed publishing content displayed on the web page, the user input including an identification of a subportion of the displayed publishing content and a sentiment input or a textual input; analyzing, for each subportion of the displayed publishing content, any user input received from each of one or more of the plurality of users in relation to the subportion; computing, for each subportion of the displayed publishing content, a sentiment score based on analysis of the analyzed user inputs received from each of one or more of the plurality of users in relation to the subportion; and displaying, for each subportion of the displayed publishing content, indicia representing the sentiment score computed for the subportion, along with at least one user element by which one or more further users are enabled to provide user input to further modify the computed and indicated sentiment score.

According to certain embodiments, systems are disclosed processing, evaluating, and displaying user input. One system includes a memory having processor-readable instructions stored therein; and a processor configured to access the memory and execute the processor-readable instructions, which when executed by the processor configures the processor to perform a method. In an exemplary method, the method includes: receiving, over an electronic network, electronic publishing content for display online; displaying the received publishing content on a web page along with one or more user elements by which one or more users may submit sentiment input or textual input in relation to the received publishing content or a subportion of the received publishing content; receiving, from each of a plurality of users, a user input related to the displayed publishing content displayed on the web page, the user input including an identification of a subportion of the displayed publishing content and a sentiment input or a textual input; analyzing, for each subportion of the displayed publishing content, any user input received from each of one or more of the plurality of users in relation to the subportion; computing, for each subportion of the displayed publishing content, a sentiment score based on analysis of the analyzed user inputs received from each of one or more of the plurality of users in relation to the subportion; and displaying, for each subportion of the displayed publishing content, indicia representing the sentiment score computed for the subportion, along with at least one user element by which one or more further users are enabled to provide user input to further modify the computed and indicated sentiment score.

According to certain embodiments, a non-transitory computer readable medium is disclosed as storing instructions that, when executed by a computer, cause the computer to perform a method, the method receiving, over an electronic network, electronic publishing content for display online; displaying the received publishing content on a web page along with one or more user elements by which one or more users may submit sentiment input or textual input in relation to the received publishing content or a subportion of the received publishing content; receiving, from each of a plurality of users, a user input related to the displayed publishing content displayed on the web page, the user input including an identification of a subportion of the displayed publishing content and a sentiment input or a textual input; analyzing, for each subportion of the displayed publishing content, any user input received from each of one or more of the plurality of users in relation to the subportion; computing, for each subportion of the displayed publishing content, a sentiment score based on analysis of the analyzed user inputs received from each of one or more of the plurality of users in relation to the subportion; and displaying, for each subportion of the displayed publishing content, indicia representing the sentiment score computed for the subportion, along with at least one user element by which one or more further users are enabled to provide user input to further modify the computed and indicated sentiment score.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 illustrates an exemplary graphical user interface (GUI) of a web page displaying published electronic content, according to an embodiment of the present disclosure.

FIG. 4 illustrates an exemplary GUI of an excerpt of a web page along with user elements for receiving user input, according to an embodiment of the present disclosure.

FIG. 6 illustrates another exemplary GUI of an excerpt of a web page along with user elements for receiving user input, according to an embodiment of the present disclosure.

FIG. 7 illustrates another exemplary GUI of an excerpt of a web page along with user elements for receiving user input, according to an embodiment of the present disclosure.

FIG. 8 illustrates another exemplary GUI of an excerpt of a web page along with user elements for receiving user input, according to an embodiment of the present disclosure.

DESCRIPTION OF THE EMBODIMENTS

Figure 1:
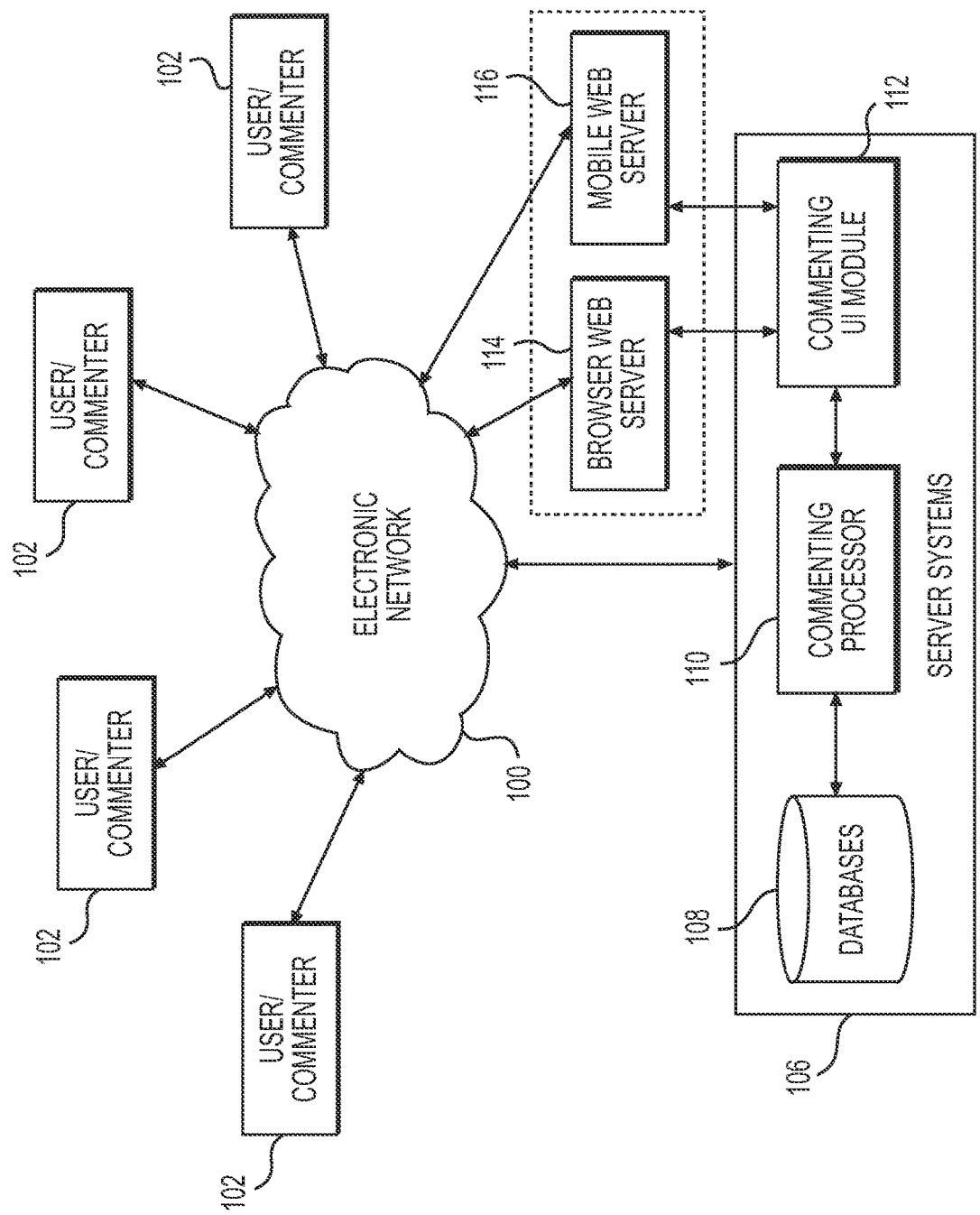
FIG. 1 is a schematic diagram of a network environment for processing and displaying user input with published content, according to an embodiment of the present disclosure.

While the present disclosure is described herein with reference to illustrative embodiments for particular applications, it should be understood that embodiments of the present disclosure are not limited thereto. Other embodiments are possible, and modifications can be made to the described embodiments within the spirit and scope of the teachings herein, as they may be applied to the above-noted field of the present disclosure or to any additional fields in which such embodiments would be of significant utility.

In view of the challenges associated with the conventional techniques outlined above, systems and methods are disclosed herein for analyzing and displaying user sentiment and user textual input adjacent to published electronic content. As described below, these challenges may be addressed in a number of ways. First, as described in further detail with respect to FIGS. 3 and 8, user inputs, e.g., comments, may be analyzed to determine (1) a sentiment score for the user input based on contextual analysis and/or other users' sentiments about said comment, (2) which subportion of a web page said comment is related to and/or (3) appropriate meta tags ("tags") to assign to said comment. Second, as described in further detail with respect to FIGS. 4-8, received user input may be associated with and displayed in spatial relation to (e.g., adjacent to) particular subportions of the published electronic content. Using various techniques, as further described below, each subportion may be assigned appropriate tags and/or a sentiment score for generating relevant indicia to associate with the subportion.

Further, in some embodiments, the challenges described above may be addressed by providing article-specific/customizable meta tags and filters that enable the user to provide context to their comment (e.g. "pro-campaign finance reform," "bad supreme court decision," "cited references," etc.). In some embodiments, the challenges described above may be addressed by enabling users to cite/remark on specific subportions of the content (e.g., targeted comments "This quoted study was debunked in the NE Journal of Medicine, see"). Additionally or alternatively, in some embodiments, the challenges described above may be addressed by providing users the means to filter and locate comments/commenters of a particular disposition. The comment meta-data, coupled with data the user opts to make public (i.e. via their profile tags, e.g. "Conservative," "Liberal," etc.) provides a more social and interactive experience.

User input, as used herein, may include comments or messages, "likes," "dislikes," etc., submitted by different users, e.g., as part of an online article, message board, or forum provided via a web page accessible over the Internet. The different users may be participants of one or more virtual conversations or message threads including a series of comments posted by different users/participants at various times to the online article, message board, or forum. The comments may be associated with an article or a blog entry displayed on the web page. Each user may post or submit user input related to a specific subportion of the article or blog entry in this example. Subportions may be a section, title, paragraph, sentence, phrase, fact, word, etc. The user input may be submitted by each user via an interface provided on a web page that is loaded within a web browser executable at the user's computing device. Also, the user input may be anything, including, but not limited to comments and/or sentiment. Comments may be in the form of electronic messages including, for example, text, graphics (e.g., icons or "emoticons"), and/or other types of content (e.g., embedded audio or video content). Sentiment may be in the form of ratings, grades, thumbs up or thumbs down, and/or up votes or down votes.

In some embodiments, comments and sentiment may be displayed in close spatial relation to subportions of electronic publishing content. Indicia may be associated with each subportion indicating user sentiment. As will be described in further detail below, a sentiment score may be calculated for a subportion based on one or more parameters associated with user input. Examples of such parameters include, but are not limited to, analysis of textual input, analysis of sentiment input, analysis of the submitting user's profile, a demographic of the submitting user, activity level of the conversation, and/or a number of users providing content related to the subportion.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Reference will now be made in detail to the exemplary embodiments of the disclosure, examples of which are illustrated in the accompanying drawings. Wherever possible, the same reference numbers will be used throughout the drawings to refer to the same or like parts.

FIG. 1 is a schematic diagram of an exemplary network environment in which electronic messages and other user input may be processed and displayed, according to an embodiment of the present disclosure. As shown in FIG. 1, the environment may include a plurality of user or commenter devices 102 that are communicatively coupled to each other as well as a plurality of server systems 106, a browser web server 114, and/or a mobile web server 116 via an electronic network 100. Electronic network 100 may include one or a combination of wired and/or wireless electronic networks. Network 100 may also include a local area network, a medium area network, or a wide area network, such as the Internet.

In one embodiment, each of user or commenter devices 102 may be any type of computing device configured to send and receive different types of content and data to and from various computing devices via network 100. Examples of such a computing device include, but are not limited to, a desktop computer or workstation, a laptop computer, a mobile handset, a personal digital assistant (PDA), a cellular telephone, a network appliance, a camera, a smart phone, an enhanced general packet radio service (EGPRS) mobile phone, a media player, a navigation device, a game console, a set-top box, or any combination of these or other types of computing devices having at least one processor, a local memory, a display (e.g., a monitor or touchscreen display), one or more user input devices, and a network communication interface. The user input device(s) may include any type or combination of input/output devices, such as a keyboard, touchpad, mouse, touchscreen, camera, and/or microphone.

In one embodiment, each of the user or commenter devices 102 may be configured to execute a web browser or mobile browser installed for displaying various types of content and data received from any of server systems 106 and/or web servers 114 and 116 via network 100. Server systems 106 in turn may be configured to receive user input, e.g., in the form of comments, from user or commenter devices 102 over electronic network 100. The comments may be submitted by a user at each device 102 through an interface provided on a web page loaded within the browser executable at each device.

While browser web server 114 and mobile web server 116 are shown separately in FIG. 1, it should be noted that web servers 114 and 116 may be implemented using a single server device or system. In an example, such a single server may be a web server that is configured to provide different versions of a web page and associated content to each of user/commenter devices 102 according to the type of device or web browser executable at the device. The different versions of the web page may include, for example, a desktop version and a mobile version, for which the web page content may be formatted appropriately for display via the particular type of browser at the device. Further, any of the devices or functionality of server systems 106, browser web server 114, and/or a mobile web server 116 may be combined together or separated, and may be operated by a single administrative entity, or outsourced to one or more other entities, such as a web hosting entity, web storage entity, and/or cloud computing service, possibly disposed remotely of each other.

As shown in the example of FIG. 1, server systems 106 may include a commenting processor 110. In an embodiment, commenting processor 110 may be configured to analyze and execute a scoring algorithm in order to calculate or compute a sentiment score, as will be described in further detail below. The sentiment score may reflect, for example, the popularity, importance, feeling, and/or positivity/negativity of a comment and/or subportion based on the user input provided with respect to the comment and/or subportion, as received from user/commenter devices 102.

Also, as shown in FIG. 1, server systems 106 may include one or more databases 108. In an embodiment, databases 108 may be any type of data store or recording medium that may be used to store any type of data including, for example, user input (e.g., comment, sentiment, etc.) as well as the scoring algorithm used to score such content. In an embodiment, commenting processor 110 may be configured to receive user input from user/commenter devices 102 and store the received content within databases 108. In some implementations, any received data may be stored in the databases 108 in an encrypted form to increase security of the data against unauthorized access.

In a further embodiment, commenting processor 110 may be configured to process the user input using the scoring algorithm. In some embodiments, sentiment scores are calculated for a user input, for a relevant subportion, or for both. For example, in some embodiments, the scoring algorithm determines the sentiment by calculating a sentiment score for the user input. Additionally or alternatively, sentiment expressed within user input may be used to calculate a sentiment score for the subportion to which the user input relates. Further, in some embodiments, the sentiment scores calculated for user input may factor into the scoring algorithm for the subportion for which they relate. For example, a subportion may have several comments related to it. A sentiment score may be determined based on an analysis of these comments so a user can see how other users feel about said subportion. It may be beneficial for the user to, additionally or alternatively, see other user opinions on these comments. For example, one comment may be a spam advertisement and thus receive low ratings from other users, thereby resulting in a low sentiment score. This comment may be highlighted in red and, as described with respect to FIG. 8, since comments with low scores may be filtered, it might not be displayed to the user at all. In some embodiments, the sentiment score of the comment may then be used in the scoring algorithm for the subportion. For example, the sentiment expressed within a comment with a low sentiment score (e.g., a comment that received low ratings from other users) may be given less weight in the scoring algorithm for calculating the sentiment score of the related subportion.

In a further example, commenting processor 110 may use the scoring algorithm to compute a sentiment score for each user comment and/or subportion within a web page or online message board or forum included within the web page. As described above, each subportion may have elicited one or more sentiments and/or comments posted or submitted by different users of the message board or forum within the web page, as displayed at each user's device (e.g., each of user/commenter devices 102). The computed sentiment score for each user input may be assigned to the subportion and used to calculate an overall sentiment score for that subportion. Indicia based on the received input and/or computed overall sentiment score may be displayed relative to the subportion. As described above, the sentiment score computed for each subportion may reflect a level of popularity, agreement, importance, feeling, and/or positivity/negativity, which may be determined based on various parameters associated with the sentiment, comment, individual participants, and/or users/commenters providing user-generated content related to the subportion. Accordingly, the subportions may be scored such that subportions determined to be relatively more agreeable, popular, important, and/or positive/negative are given relatively high sentiment scores, and may be, for example, associated with indicia identifying relative agreeableness, popularity, importance, and/or positivity/negativity.

Server systems 106 may also include a commenting user interface (UI) module 112 that facilitates receiving user input from users and displaying the received user input. The displayed content may include, for example, user input that has been processed or scored along with the subportion to which it relates, as described above. For example, commenting UI module 112 may be configured to generate, render, and transmit web page content including an article or blog entry. Such web page content may be divided into subportions. Displayed within the webpage may be one or more message streams of comments posted by users related to some or all subportions. Thus, the web page content may include user input in the form of comments/sentiment. The user input may include displaying, for example, any one or combination of text, images, sentiment (e.g., icons for users to "like" or "pin" their favorite subportions or comments, etc.) to user/commenter devices 102 via network 100. Additional features and characteristics of the commenting and scoring functionality of commenting processor 110 will be described in further detail below with respect to the exemplary graphical user interfaces (GUIs) of comments and sentiments associated with subportions of a web illustrated in FIGS. 3-8.

Figure 2:
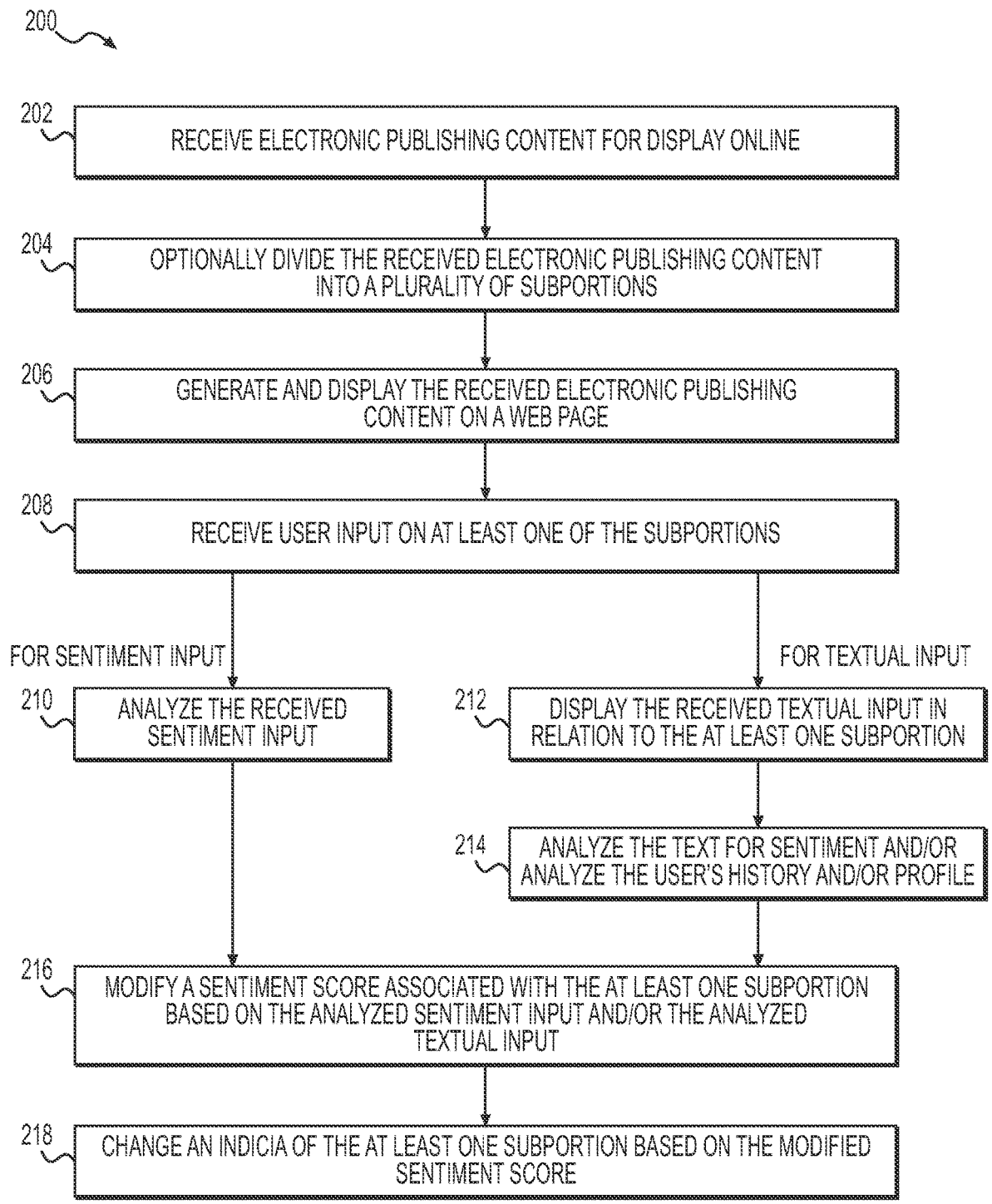
FIG. 2 is a flow diagram of an exemplary method for analyzing user input related to subportions of published content and displaying indicia based on the analysis, according to an embodiment of the present disclosure.

FIG. 2 is a flow diagram of method 200 for changing and displaying a sentiment score indicating the user sentiment for a subportion of received electronic publishing content of a web page, according to an embodiment of the present disclosure. It should be noted that, although this exemplary method describes sentiment scores for subportions of a web page, this method may be applied to user comments to identify a sentiment score, display indicia, and/or tag a user comment or comment conversation. The method may involve algorithmically computing a sentiment score for each subportion. For example, the score may be a function of a number of factors, which may be represented as a combination of variables for a scoring formula. The score may be updated periodically or as desired by adjusting a value of each variable within the formula. In an embodiment, the score may be updated dynamically in response to detecting or receiving an indication of a new user action with respect to a subportion or a comment on the subportion. Such a new user action may include, for example, the addition of user input (e.g., a new comment, a new "thumbs up") related to a subportion of the electronic content. The user input may be received from a user or user device (e.g., any of user/commenter devices 102 of FIG. 1, as described above) via a communication network (e.g., network 100 of FIG. 1, as described above).

As shown in FIG. 2, method 200 may include steps 202, 204, 206, 208, 210, 212, 214, 216, and 218. However, it should be noted that method 200 may include more or fewer steps as desired for a particular implementation. In an example, one or more of the above-listed steps of method 200 may be executed by server systems 106, browser web server 114, and/or mobile web server 116 of FIG. 1, as described above. However, method 200 is not intended to be limited thereto, and the steps of method 200 may be performed by any server or other type of computing device having at least one processor, a memory, and a network communication interface for sending and receiving information from one or more user devices.

As shown in FIG. 2, method 200 may include receiving electronic publishing content for display online (step 202). Method 200 may also include dividing the received content into a plurality of subportions (step 204). In some examples, the electronic content for display online may be an article or blog entry. In some embodiments, the received content may be divided into letters, words, phrases, sentences, paragraphs, and/or sections. In some embodiments, step 204 may not be performed initially, and instead, subportions may be created once a user/users select a portion of the electronic content for comment or sentiment. For example, a user may highlight a phrase he/she wishes to comment on and then this highlighted portion may be designated as a subportion.

In step 206, a server, e.g., browser web server 114 and/or mobile web server 116 of FIG. 1, may generate and display the received content on a web page. In some embodiments, the indicia distinguishing subportions may be displayed during step 206 as well. Once the received content is displayed on the web page, a user may be able to provide input (e.g., comments or sentiments) related to subportions of the web page. In step 208, a server may receive such user input on at least one of the subportions. The user input may be any type of input. The user input may also include an identification and/or designation of a user-specific subportion of the electronic publishing electronic publishing content. For example, a user may select some words or sentences, may select and drag, may highlight, etc. User input may be received from a user/commenter device 102 over the Internet.

FIG. 2 reflects that the received user input may include sentiment input and/or textual input, but this disclosure is not limited thereto. In some embodiments, if a sentiment input was received in step 208, method 200 may proceed to step 210. Sentiment input may include receiving from one user/commenter device 102 a "rating," a "like," a "favorite," a "block," an "up vote," a "thumbs down," or any other action for expressing sentiment. The received sentiment input may be analyzed (step 210). In some embodiments, the analysis may include determining whether the sentiment is positive or negative. For example, in some embodiments, a thumbs up or thumbs down icon may be available for sentiment input. If a user selects the thumbs up icon, an analysis may determine that this is a positive input. In some examples, indicia of this sentiment may be displayed. There may be a count of each thumbs up or thumbs down. If the current display shows 58 thumbs up and 43 thumbs down and user selects thumbs down, the display may update to 58 thumbs up and 44 thumbs down. In one embodiment, sentiment may be a sliding scale of 1-5, the Liked scale, etc.

Once the received sentiment input has been analyzed, method 200 may proceed to step 216.

If, in step 208, the received user input is textual input (e.g. a comment) related to the at least one subportion of the web page, method 200 may proceed to 212. In step 212, the received textual input may be displayed in relation to the subportion. For example, as shown in FIG. 4, the user's textual input related to subportion 304 may be displayed in comment box 422. Method 200 may then proceed to step 214 or, in some embodiments, method 200 may skip step 212 and proceed to step 214 after receiving user textual input in step 208.

In step 214, method 200 may include analyzing the text for sentiment. In some embodiments, a keyword search may be performed to determine sentiment. For example, if a negative word (e.g., "disagree") is detected within the textual input, the analysis may determine the sentiment of the textual input is negative. If strong sentiment terms or words (e.g., "love") are detected, the analysis may determine the sentiment of the textual input is highly positive or negative. Similarly, if there are multiple positive terms within the textual input, the analysis may determine the sentiment of the textual input is highly positive. Other analysis of the textual input may also include length, punctuation, etc.

In some embodiments, the user's action history and/or user's profile may, additionally or alternatively, be analyzed in step 214. The sentiment of a user's textual input and/or appropriate tags for said input may be based on a user's profile or history by default. For example, if the user identifies as a liberal in his/her profile, textual input related to a subportion praising conservatives may, by default, be analyzed as being a negative sentiment. Similarly, if a user's history shows repeated negative textual input when an article, comment, and/or subportion praise liberals, all comments on subportions praising liberals may, by default be analyzed as containing a negative sentiment. In some embodiments, a user may wish to hide words like "liberal" and "conservative" from being pulled from their profiles to analyze comments.

Other examples of relevant statistics that may be used during the analysis of the textual input may include, but are not limited to, the number of comments received (e.g., during a predetermined period of time), the time-of-day when the comments are received, and parameters (e.g., geographic location, noteworthiness or popularity, commenting frequency, etc.) of the users from which comments are received. In an embodiment, each user may be associated with a popularity index or rating. The popularity rating of a user may be based on, for example, the number of other users who may be listed as "fans" or "followers" of the user. Additionally or alternatively, the popularity rating may be based on the number of "likes" or number of times that other users have marked a comment posted by the user as a favorite or otherwise indicated their approval of the user's comments. Other users may indicate themselves to be fans of the user or mark a comment by the user as a favorite by selecting a user interface control element provided via, for example, a GUI for displaying conversations and user-submitted comments associated with an online message board or forum.

In some embodiments, textual input may also be analyzed for appropriate tags. Analyzing comments for appropriate tags will be described in further detail below.

After completion of step 214, method 200 may proceed to step 216. In step 216, a sentiment score associated with the at least one subportion may be modified. This modification may be based on the analysis in step 210 of the received sentiment input and/or the analysis in step 214 of the received textual input. In some embodiments, a sentiment score may be initially set at a neutral position (for example, 0 in a scale from −5 to +5, or 2.5 out of 5 stars) and each time a user provides feedback/sentiment regarding that subportion, the sentiment score may be adjusted. After modifying the sentiment score associated with the at least one subportion, method 200 may proceed to step 218. In step 218, a server may change user sentiment indicia of the at least one subportion based on the modified sentiment score. In some embodiments, if the sentiment score was decreased due to negative sentiment input or textual input, a box encompassing the at least one subportion may turn from dark green to light green or a set of stars may go from 3.8 to 3.75 stars.

FIG. 3 illustrates an exemplary GUI for displaying received electronic content on a web page. Specifically, FIG. 3 depicts an entire article, "Changing Political Landscapes," published on a web page. In the embodiment illustrated in FIG. 3, title 2 is displayed above a "Show Sentiment" icon 4 and "Hide Sentiment" icon 6. The body of the article is displayed below "Show Sentiment" icon 4 and "Hide Sentiment" icon 6, although these icons could be shown anywhere on the web page. In this embodiment, the body of the article may be divided into subportions, each subportion corresponding to a paragraph. For example, the article displayed in FIG. 3 may be divided into subportions 302, 304, 306, 308, 310, 312, and 314.

An overall comment box 316 for commenting on the article as a whole may displayed below the body of the article. In some embodiments, a user may provide textual input (e.g., a comment) within overall comment box 316. In such a case, the user may not be targeting any particular subportion of the web page to provide sentiment for. In some embodiments, an analysis may be performed on the user's textual input within the overall comment box 316. For example, if the user quotes a section of the article, (e.g. "SIXTY-FOUR PERCENT OF AMERICANS VIEW THE REPUBLICAN PARTY UNFAVORABLY" from subportion 304) an analysis may determine the user is providing sentiment related to subportion 304. This comment may then be assigned a tag associating it with subportion 304. In some embodiments, a direct quote may not be necessary and common keywords may be used to associate comments with a particular subsection. For example, if textual input is entered into the overall comment box 316 that contains the word "Boehner," this comment may be associated with subportion 308, since it is the only subportion that mentions John Boehner. In some embodiments, if comments directed to a particular subportion are displayed, textual input to the overall comment box 316 with a tag assigning it to that subportion may also be displayed.

In some embodiments, the textual input into the overall comment box 316 may also be analyzed for sentiment. If negative words like "lie," "disagree," "false," etc. appear within the comment, the sentiment score associated with the comment and/or subportion 304 may be decreased. Similarly, the user's history and/or profile may be analyzed. If the user identifies himself as a Republican, the assumption may be made that the user does not like a subportion describing the low ratings of the Republican Party. The sentiment score for subportion 304 may thus be decreased. If the user's history includes many positive comments or sentiments for quotes, articles, subportions, etc. that describe low ratings for the Republican Party, it may be assumed this comment is also positive. The sentiment score for subportion 304 may thus be increased based on this user history.

FIG. 4 illustrates an excerpt of the electronic content. In this figure, the excerpt is the body of the article. A user may highlight a portion of text within the electronic content, e.g., "IT'S ONLY A 2-POINT INCREASE FROM A SURVEY TAKEN SEPT. 27 THROUGH 29" of subportion 304. When a user selects a subportion or highlights text within a subportion, a comment box, e.g. comment box 422, may be displayed proximate to subportion 304. In the example illustrated in FIG. 4, if the user selects text within subportion 304, comment box 422 may be displayed under subportion 304 and the user may insert textual input within comment box 422. Display of user textual input is described below with respect to FIG. 8.

In some embodiments, the user's textual input may be categorized or assigned tag. For example, a server may auto-suggest tags relevant to the textual input (e.g., if the user quotes something, the server may assign a tag related to the quote.) The server may automatically tag a comment by default. For example, if the comment recites a quote from the text about a particular politician, e.g., John Boehner, the comment and/or subsection may automatically be tagged with a tag entitled "John Boehner." In some embodiments, the user who submitted the comment or other users reading the comment may un-tag irrelevant/incorrect tags. In some embodiments, the user may create tags for his/her own comments. Additionally or alternatively, other users may assign tags to a comment.

In some embodiments, tags may be automatically associated with one another. For example, if one quote is subject to many comments, many of which are commonly associated with two tags, the two tags may automatically be associated with one another by the system. If a subsequent user sorts or selectively displays the comments by selecting the first tag, the second tag may additionally be suggested by the system for display and/or sorting purposes.

In some embodiments, candidate tags may be created based upon the comment. The confidence in these candidate tags may be increased in response to analyzing the user's profile and prior comments. For example, political persuasion, religious persuasion, etc., may be tags gleaned from the comment, other comments the user has made, and/or the user's profile. For example, the comment may cause the automatic creation of a candidate tag "liberal." However, upon review of the candidate's profile and previous comments, the tag of "liberal" may be discarded. Another tag, for example, "libertarian," may also be automatically chosen. A tag may also simply be the username, which would allow other users to search for comments made by that user.

Figure 5:
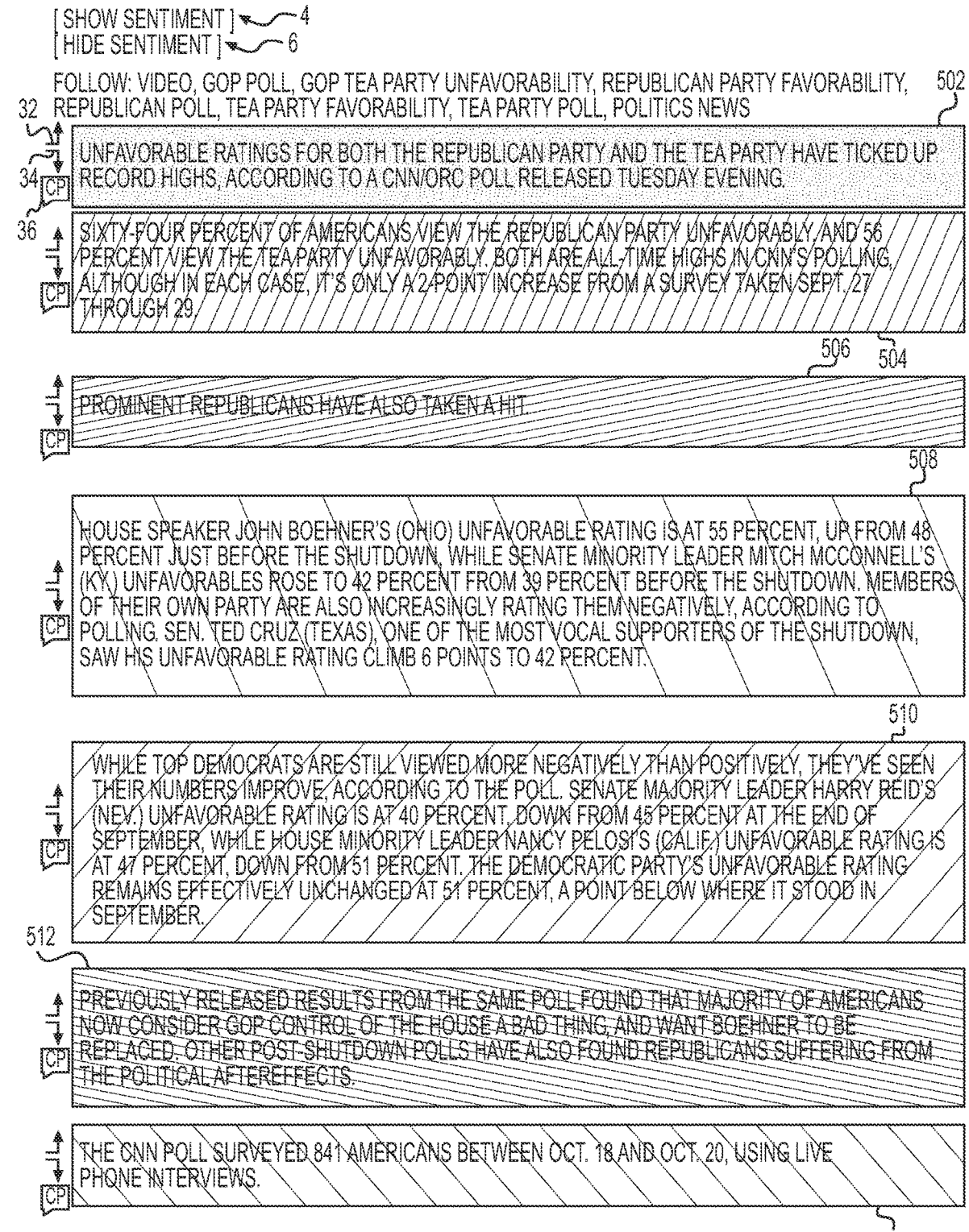
FIG. 5 illustrates another exemplary GUI of an excerpt of a web page along with user elements for receiving user input, according to an embodiment of the present disclosure.

FIG. 5 illustrates another embodiment of an excerpt of the electronic content. Specifically, FIG. 5 depicts a view of the body of an article once a user selects the "Show Sentiment" icon 4. It should be noted that in some embodiments, a web page may initially be displayed with indicia of sentiment for each subportion without user interaction with show sentiment icon 4.

A user may provide sentiment input for each subportion of the article. In the embodiment illustrated in FIG. 5, a user may provide sentiment input by selecting the up vote icon 32 or the down vote icon 34. A user may provide textual input by, as described with respect to FIG. 4, selecting text within a subportion or selecting any point within the subportion. Such actions may cause a comment box to appear. In some embodiments, selecting the comment point icon 36 may cause a comment box to appear to receive textual input from the user. Additionally or alternatively, selecting the comment point icon 36 may display previous user comments, as further described with respect to FIG. 8 below. As shown in FIGS. 5-8, each of subportions 502, 504, 506, 508, 510, 512, and 514 may be associated with a way of providing sentiment input and/or textual input. The up/down vote, comment boxes, and configuration of the GUI are merely exemplary.

In the embodiment illustrated in FIG. 5, each of subportions 502, 504, 506, 508, 510, 512, and 514 may have indicia based on its sentiment score. As shown in FIG. 5, these indicia may include shading and/or coloration, each shading/coloration indicating a sentiment score or a range of sentiment scores. The indicia may be any indication that expresses a range of sentiment scores, for example, various colors, number of stars, percentages, etc. In some embodiments, for example, a range of colors from green to red may encompass each subportion. A green box may encompass a subportion that may have a high or very positive sentiment score. Whereas a dark red box may encompass a subportion that may have a very negative sentiment score. As described in FIG. 2, a very negative sentiment score may be due to, for example, multiple negative sentiment input (e.g., many down votes), strong negative sentiment input (e.g., 2% out of 100%), and/or negative textual input (e.g., multiple comments including negative words like "hate," "strongly disagree," "incorrect," etc.).

FIG. 6 illustrates another embodiment of an excerpt of the electronic content. Specifically, FIG. 6 depicts a view of the body of an article when both indicia of sentiment and a comment box 62 are displayed to the user. In some embodiments, a comment box may be initially displayed for each subportion without user interaction. In some embodiments, if a user indicates a desire to comment on a specific subportion (e.g., by selecting a subportion 502, highlighting text with subportion 502, or selecting comment point icon 36) comment box 62 may be displayed proximate to said subportion.

In some embodiments, a user may make several comments about a single subportion. For example, as illustrated in FIG. 7, a user may make multiple comments with respect to subportion 502. Display of each of comment boxes 72, 74, and 76 may be initiated in a different way. For example, the user may have selected comment point icon 36 to initiate display of comment box 76, allowing the user to add textual input related to subportion 502. Additionally or alternatively, the user may click/select any point within subportion 502 to initiate display of comment box 74, allowing the user to add textual input related to subportion 502. In some embodiments, the user may highlight a specific section of the subportion 502. As shown in FIG. 7, the user may highlight the term "THE REPUBLICAN PARTY" to initiate display of the comment box 72 may be displayed, allowing the user to input text related to "THE REPUBLICAN PARTY," and not the entirety of subportion 502.

In some embodiments, the ability to provide sentiment (e.g. sentiment input or textual input) related to individual words or phrases within a paragraph (e.g., "THE REPUBLICAN PARTY"), may be used to calculate a sentiment score for the phrase, separate from the full paragraph or subportion. For example, subportion 508 of FIG. 7 is marked with first indicia. In FIG. 7, the first indicia may include a first shading encompassing subportion 508. The phrase "42 PERCENT FROM 39 PERCENT" may have second indicia (e.g., second shading). This second shading may indicate that the phrase "42 PERCENT FROM 39 PERCENT" may have a different sentiment score associated with it than the remaining portions of subportion 508.

In some embodiments, a user may select an indicator (e.g. click a shaded portion encompassing a subportion). The input of other users may then be displayed to show how/why the subportion is designated with that indicator. For example, sentiment scores, number of comments/votes or the actual previous use comments may be displayed.

FIG. 8 illustrates another embodiment of an excerpt of the electronic content. Specifically, FIG. 8 depicts a view of the body of an article when both indicia of user sentiment for a plurality of subsections and previous user comments 32, 34, and 36 are displayed to the user. These comments may be displayed proximate the subportion to which they relate. Previous user comments 32, 34, and 36 may have been submitted by any user, including the user currently viewing the web page. The previous comments may be in any order and displayed in any configuration.

It may be determined which subportion they relate to by tagging them when a user selected the subportion or terms within the subportion as described in FIG. 2-7. Additionally or alternatively, comments submitted in overall comment box 316 may be tagged to relate to a specific subportion and thus displayed proximate to that subportion. These comments may be determined to be related to a subportion by analysis of the text, the submitting user's tags, and/or other users' tags of the comment.

In some embodiments, previous user comments related to subportions may be displayed initially, without user action. In some embodiments, previous user comments related to subportions may not be displayed until some user action is taken. For example, a user may select the comment point icon 36. In some embodiments, previous user comments may be displayed when a user "hovers" or "mouse" over a particular quote or portion of the text. This "hovering" action may result in comments previously tagged as relevant to the text to automatically pop up over the text. These previously tagged comments may be sorted by default by popularity, time made, ideological similarity with the user, etc.

In some embodiments, previous user comments may be filtered. The user currently viewing the web page may select a filter. In some embodiments, the web page administer, content provider, etc. may choose to filter which comments are displayed.

In some embodiments, previous user comments may be filtered by user sentiment. Users may provide sentiment (e.g. sentiment input, textual input, etc.) with respect to previous user comments. In such embodiments, a sentiment score may be calculated for each comment as well. This calculation may be performed in a manner similar to that described with respect to web page subportions of FIG. 2. In some embodiments, a user or a web page administrator may filter all comments with less than three stars, thus only displaying comments with a sentiment score of 3 or more stars, for example.

In some embodiments, tags may be used to filter comments. Comments may be filtered by these tags. A user or content provider may select that only comments associated with certain tags be displayed. The selection may be done by the user typing the desired tag. For example, a user may type in a username if the user wants to see all comments by a specific user. A user may type "liberal" to see all comments tagged as being made by a liberal user.

A user may select a "show me similar comments" icon to automatically search for comments with a similar set of tags, comments related to the same or similar quoted portion of the content, and/or comments from users with a similar level of respect (e.g., users with a large number of up votes per comment).

In some embodiments, comments may be sorted by user respect. This may be determined by, for example, the average number of up votes per comment that the user has made. User respect may also be sorted by the ratio of up votes to down votes. A higher ratio of up votes to down votes in a user's comment history may be a better indicator of comment quality than the sheer number of up votes.

A user may set all of these comment preferences by default. For example, a user may set rules such that only user accounts associated with a "liberal" or "moderate" tag be displayed in the comments section. A user may also set a rule that only users with a user respect above a predetermined level be displayed. Multiple rules may also be combined and/or prioritized. A plurality of rules and a hierarchy of sorting priorities may also be designated for each piece of content and/or by default. For example, a user may designate that only comments associated with a "conservative" tag be displayed, sorted primarily by date, and secondarily by user respect. These rules may be set by default for all content In some embodiments, filter rules may be automatically created. For example, a user's comments and interactions may be monitored. For example, a server may monitor the tags associated with comments for which the user provides sentiment input (e.g., up votes and down votes), provides textual input (e.g., comments on), or otherwise interacts with. Rules may automatically be created for comment display based upon these interactions. For example, if a user tends to up vote comments which are associated with a "liberal" tag and a high level of user respect, then an automatic rule may be created which displays content to the user matching these tags.

In some embodiments, comments may automatically be associated with other comments quoting the same or similar portions of the content. There may be a predetermined proximity threshold for two comments to be considered related. For example, a first comment may quote or tag "four score" and a second comment may quote or tag "and seven years ago" from a passage in content that reads "four score and seven years ago." Since the two comments concern adjoining text, they may be associated with each other as being within a predetermined proximity threshold.

Similarly, in some embodiments, tag associations may also be based on grammar and punctuation. For example, comments that cite "four score" may be associated with comments that cite "seven years ago" because both portions of the content come from the same sentence. Alternatively or in addition, comments may be associated with each other and tagged accordingly if they are on the same side of a comma, hyphen, semi-colon, or any other manner of associating comments by grammar and punctuation. Two portions of a content piece may be given confidence scores based on multiple criteria, with a confidence above a predetermined threshold causing two comments to become associated with each other. For example, a confidence score that two comments are related may be increased based upon shared words in the comments themselves, proximity of the quoted content pieces to each other, whether the quotes overlap or are in the same sentence, etc.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

The examples described above with respect to FIGS. 1-8, or any part(s) or function(s) thereof, may be implemented using hardware, software modules, firmware, tangible computer readable media having instructions stored thereon, or a combination thereof and may be implemented in one or more computer systems or other processing systems.

Figure 9:
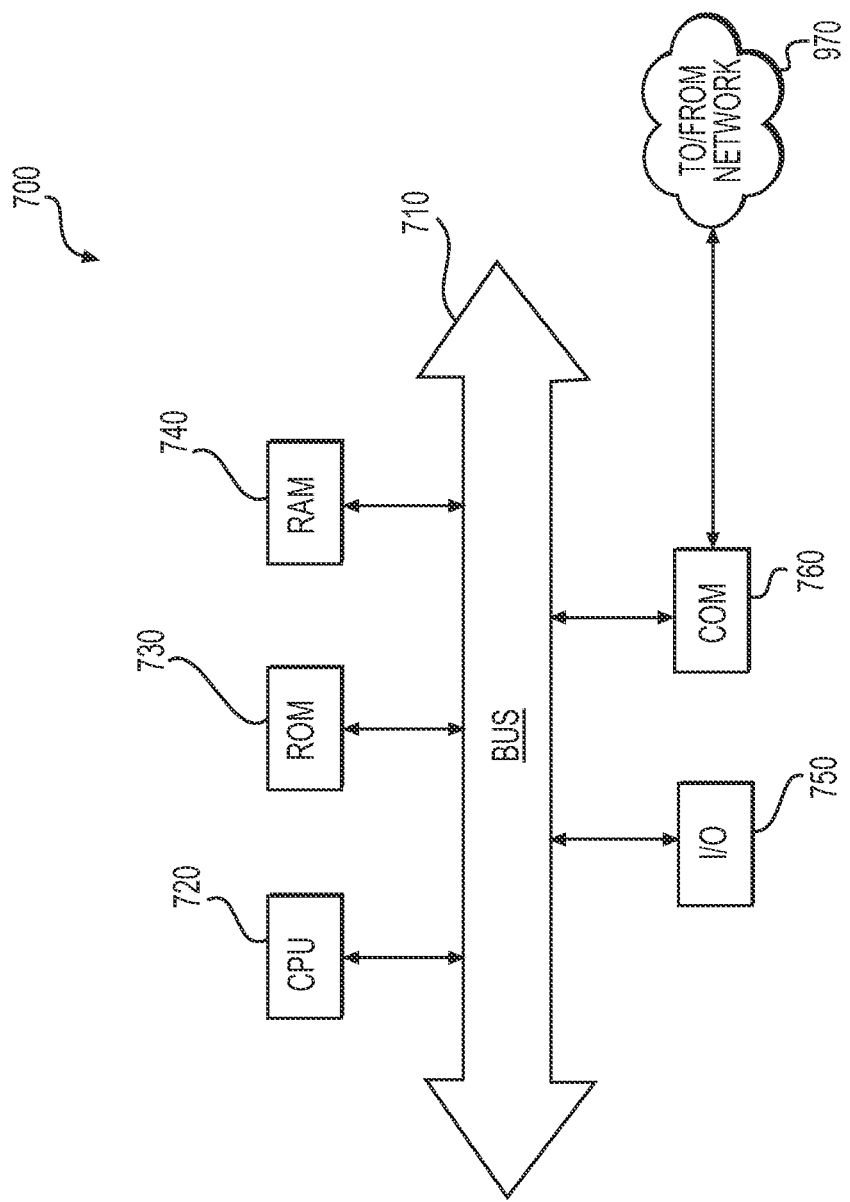
FIG. 9 is a block diagram of an exemplary computer system in which embodiments of the present disclosure may be implemented.

FIG. 9 illustrates a high-level functional block diagram of an exemplary computer system 700, in which embodiments of the present disclosure, or portions thereof, may be implemented, e.g., as computer-readable code. For example, each of the exemplary devices and systems described above with respect to FIGS. 1-8 can be implemented in computer system 700 using hardware, software, firmware, tangible computer readable media having instructions stored thereon, or a combination thereof and may be implemented in one or more computer systems or other processing systems. Hardware, software, or any combination of such may embody any of the modules and components in FIG. 1, as described above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the present disclosure, as described above in the examples of FIGS. 1-8 may be implemented using computer system 700. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 9, computer system 700 includes a central processing unit (CPU) 720. CPU 720 may be any type of processor device including, for example, any type of special purpose or a general purpose microprocessor device. As will be appreciated by persons skilled in the relevant art, CPU 720 also may be a single processor in a multi-core/multiprocessor system, such system operating alone, or in a cluster of computing devices operating in a cluster or server farm. CPU 720 is connected to a data communication infrastructure 710, for example, a bus, message queue, network, or multi-core message-passing scheme.

Computer system 700 also includes a main memory 740, for example, random access memory (RAM), and may also include a secondary memory 730. Secondary memory 730, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 730 may include other similar means for allowing computer programs or other instructions to be loaded into computer system 700. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 700. Control system 700 may receive programming and data via network communications 970.

Computer system 700 may also include a communications interface ("COM") 760. Communications interface 760 allows software and data to be transferred between computer system 700 and external devices. Communications interface 760 may include a modem, a network interface (such as an Ethernet card), a communications port, a PCM-CIA slot and card, or the like. Software and data transferred via communications interface 760 may be in the form of signals, which may be electronic, electromagnetic, optical, or other signals capable of being received by communications interface 760. These signals may be provided to communications interface 760 via a communications path of computer system 700, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Computer system 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for evaluating user input relating to electronic published content, the method comprising:

receiving, over an electronic network, a single piece of authored electronic publishing content for display online;

displaying the received single piece of authored electronic publishing content on a web page along with one or more user feedback elements;

dividing the single piece of authored electronic publishing content into a plurality of subportions, each of the plurality of subportions corresponding to a paragraph of the single piece of authored electronic publishing content;

receiving, from one or more of a plurality of users, a first user input related to the displayed single piece of authored electronic publishing content displayed on the web page, wherein the first user input comprises an identification of a subportion of the plurality of subportions of the displayed single piece of authored electronic publishing content and a first user input type regarding the identified subportion, wherein the first user input type is a sentiment input regarding the identified subportion;

receiving, from the one or more of the plurality of users, a second user input related to the displayed single piece of authored electronic publishing content displayed on the web page, wherein the second user input comprises an identification of one or more words of the subportion of the plurality of subportions of the displayed single piece of authored electronic publishing content and the first user input type regarding the identified one or more words of the subportion;

analyzing, for each subportion of the displayed single piece of authored electronic publishing content, the first user input and the second user input received from each of the one or more of the plurality of users in relation to the subportion, wherein analyzing the first user input and the second user input includes analyzing an action history of at least one of a first user and a second user;

computing, for each subportion of the displayed single piece of authored electronic publishing content, a sentiment score based on analysis of the analyzed first user input and the second user input received from each of the one or more of the plurality of users in relation to the subportion; and displaying, for each subportion of the displayed single piece of authored electronic publishing content, an indicator representing the sentiment score computed for the subportion of the displayed single piece of authored electronic publishing content, wherein the indicator is displayed along with at least one user element by which one or more further users are enabled to provide a third user input to further modify the computed and indicated sentiment score, and wherein the at least one user element includes at least one of a thumbs up and a thumbs down icon; and wherein the first user input, the second user input, and the third user input further comprise one or more tags received from the one or more of the plurality of users in relation to one or more subportions of the single piece of authored electronic publishing content, and wherein filter rules may be automatically created based on the one or more tags received from the one or more of the plurality of users.

2. The computer-implemented method of claim 1, wherein the first user input and the second user input further comprise a second user input type, wherein the second user input type comprises a textual input.

3. The computer-implemented method of claim 1, wherein the third user input comprise a sentiment input and/or a textual input.

4. The computer-implemented method of claim 1, further comprising:

receiving, from an additional user, a fourth user input related to the displayed single piece of authored electronic publishing content displayed on the web page, the fourth user input including a second identification of a second subportion of the displayed single piece of authored electronic publishing content and a second sentiment input or a second textual input;

computing, for the second subportion, a modified sentiment score based on the fourth user input; and changing an indicator associated with at least one of the plurality of subportions based on a modified sentiment score.

5. A computer system for evaluating user input relating to electronic published content, the system comprising:

a memory device storing instructions for evaluating user input; and a processor configured to execute the instructions to perform a method of:

receiving, over an electronic network, a single piece of authored electronic publishing content for display online;

displaying the received single piece of authored electronic publishing content on a web page along with one or more user feedback elements;

dividing the single piece of authored electronic publishing content into a plurality of subportions, each of the plurality of subportions corresponding to a paragraph of the single piece of authored electronic publishing content;

receiving, from one or more of a plurality of users, a first user input related to the displayed single piece of authored electronic publishing content displayed on the web page, wherein the first user input comprises an identification of a subportion of the plurality of subportions of the displayed single piece of authored electronic publishing content and a first user input type regarding the identified subportion wherein the first user input type is a sentiment input regarding the identified subportion;

receiving, from the one or more of the plurality of users, a second user input related to the displayed single piece of authored electronic publishing content displayed on the web page, wherein the second user input comprises an identification of one or more words of the subportion of the plurality of subportions of the displayed single piece of authored electronic publishing content and the first user input type regarding the identified one or more words of the subportion;

analyzing, for each subportion of the displayed single piece of authored electronic publishing content, the first user input and the second user input received from each of the one or more of the plurality of users in relation to the subportion, wherein analyzing the first user input and the second user input includes analyzing an action history of at least one of a first user and a second user;

computing, for each subportion of the displayed single piece of authored electronic publishing content, a sentiment score based on analysis of the analyzed first user input and the second user input received from each of the one or more of the plurality of users in relation to the subportion; and displaying, for each subportion of the displayed single piece of authored electronic publishing content, an indicator representing the sentiment score computed for the subportion of the displayed single piece of authored electronic publishing content, wherein the indicator is displayed along with at least one user element by which one or more further users are enabled to provide a third user input to further modify the computed and indicated sentiment score, and wherein the at least one user element includes at least one of a thumbs up and a thumbs down icon; and wherein the first user input, the second user input, and the third user input further comprise one or more tags received from the one or more of the plurality of users in relation to one or more subportions of the single piece of authored electronic publishing content, and wherein filter rules may be automatically created based on the one or more tags received from the one or more of the plurality of users.

6. The computer system of claim 5, wherein the first user input and the second user input further comprise a second user input type, wherein the second user input type comprises a textual input.

7. The computer system of claim 5, wherein the sentiment score is assigned to one of a sentiment input and a textual input.

8. The computer system of claim 5, further comprising:
receiving, from an additional user, a fourth user input related to the displayed single piece of authored electronic publishing content displayed on the web page, the fourth user input including a second identification of a second subportion of the displayed single piece of authored electronic publishing content and a second sentiment input or a second textual input;
computing, for the second subportion, a modified sentiment score based on the fourth user input; and
changing an indicator associated with at least one of the plurality of subportions based on a modified sentiment score.

9. A non-transitory computer-readable medium storing instructions, then instructions, when executed by a computer system cause the computer system to perform a method, the method comprising:

receiving, over an electronic network, a single piece of authored electronic publishing content for display online;

displaying the received single piece of authored electronic publishing content on a web page along with one or more user feedback elements;

dividing the single piece of authored electronic publishing content into a plurality of subportions, each of the plurality of subportions corresponding to a paragraph of the single piece of authored electronic publishing content;

receiving, from one or more of a plurality of users, a first user input related to the displayed single piece of authored electronic publishing content displayed on the web page, the first user input including an identification of a subportion of the plurality of subportions of the displayed single piece of authored electronic publishing content and a first user input type regarding the identified subportion, wherein the first user input type is a sentiment input regarding the identified subportion;

receiving, from the one or more of the plurality of users, a second user input related to the displayed single piece of authored electronic publishing content displayed on the web page, the second user input including an identification of one or more words of the subportion of the plurality of subportions of the displayed single piece of authored electronic publishing content and the first user input type regarding the identified one or more words of the subportion;

analyzing, for each subportion of the displayed single piece of authored electronic publishing content, the first user input and the second user input received from each of the one or more of the plurality of users in relation to the subportion, wherein analyzing the first user input and the second user input includes analyzing an action history of at least one of a first user and a second user;

computing, for each subportion of the displayed single piece of authored electronic publishing content, a sentiment score based on analysis of the analyzed first user input and the second user input received from each of the one or more of the plurality of users in relation to the subportion; and displaying, for each subportion of the displayed single piece of authored electronic publishing content, an indicator representing the sentiment score computed for the subportion of the displayed single piece of authored electronic publishing content, wherein the indicator is displayed along with at least one user element by which one or more further users are enabled to provide a third user input to further modify the computed and indicated sentiment score, and wherein the at least one user element includes at least one of a thumbs up and a thumbs down icon; and wherein the first user input, the second user input, and the third user input further comprise one or more tags received from the one or more of the plurality of users in relation to one or more subportions of the single piece of authored electronic publishing content, and wherein filter rules may be automatically created based on the one or more tags received from the one or more of the plurality of users.

10. The non-transitory computer-readable medium of claim 9, wherein the first user input and the second user input further comprise a second user input type, wherein the second user input type comprises a textual input.

11. The non-transitory computer-readable medium of claim 9, wherein the sentiment score is assigned to one of a sentiment input and a textual input.

\* \* \* \* \*